June 5, 1934.  M. DE HAAS ET AL  1,961,129
MILLING MACHINE
Filed May 25, 1931   4 Sheets-Sheet 4

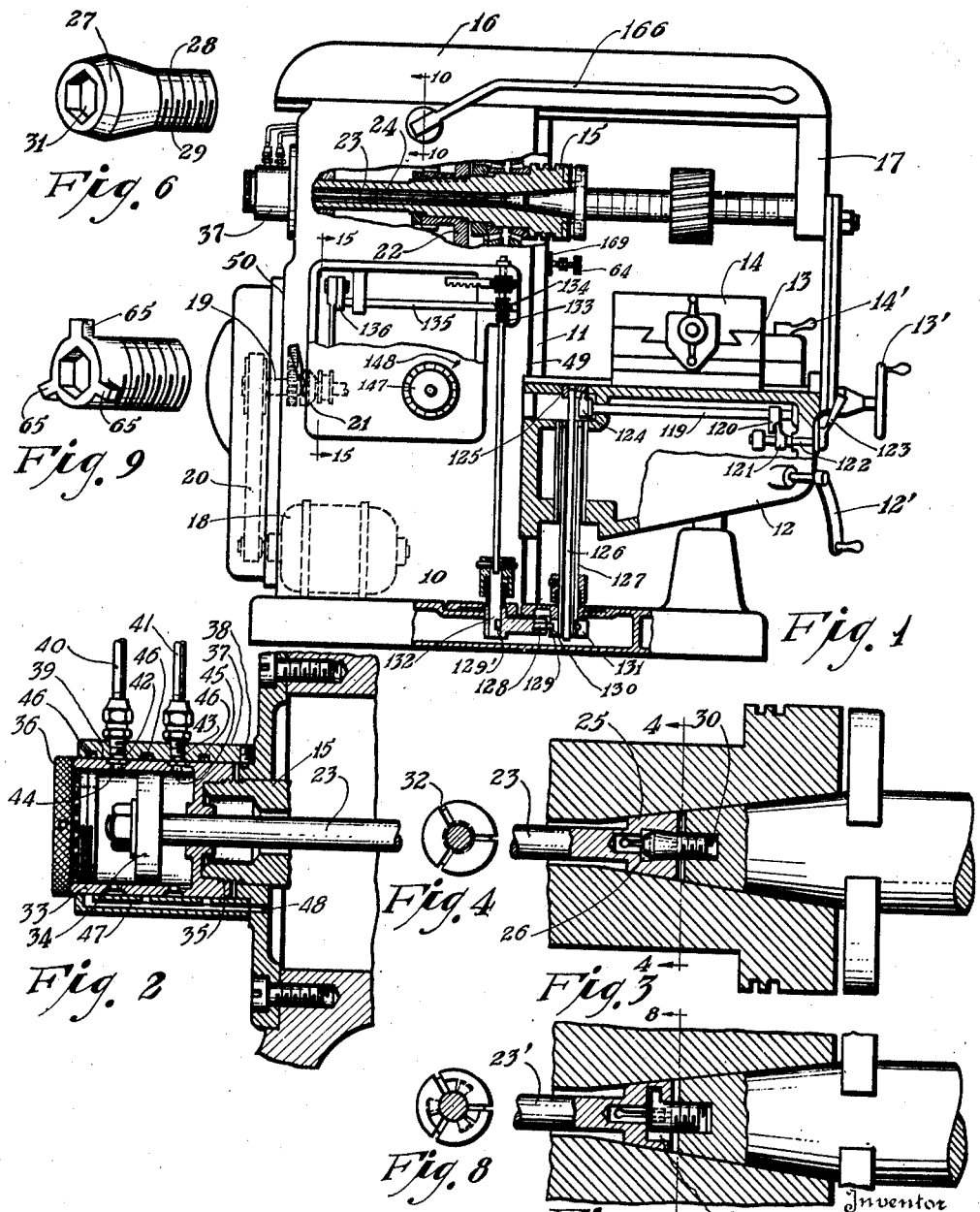

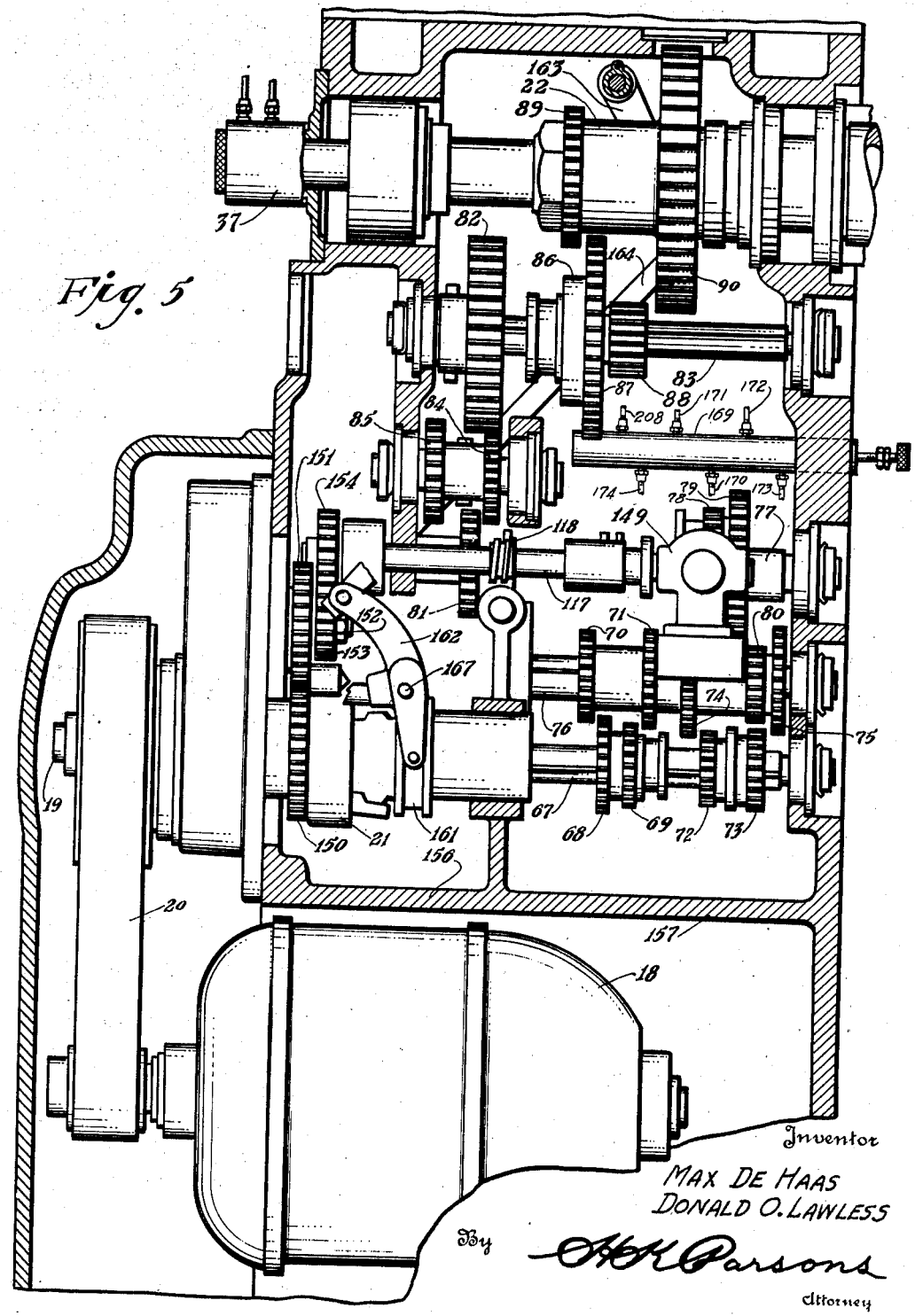

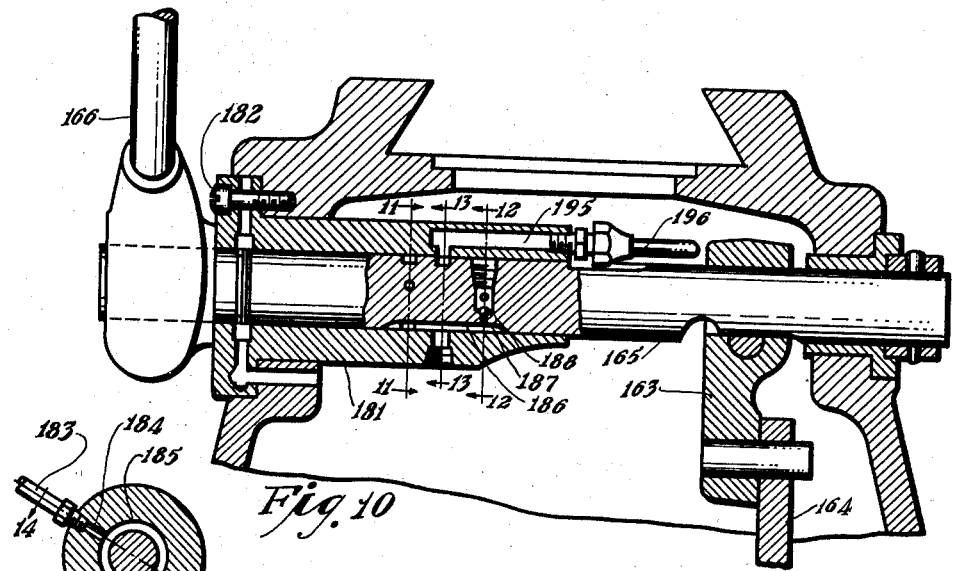
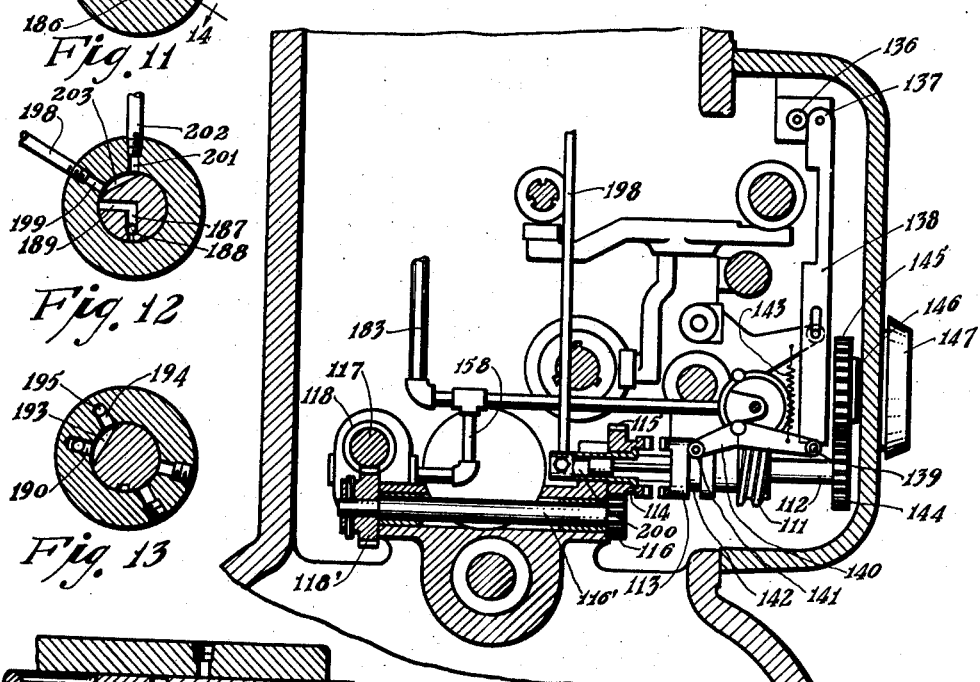

Inventor
MAX DE HAAS
DONALD O. LAWLESS
By A. H. K. Parsons
Attorney

Patented June 5, 1934

1,961,129

UNITED STATES PATENT OFFICE 1,961,129

MILLING MACHINE

Max De Haas, and Donald O. Lawless, Cincinnati, Ohio, assignors to The Cincinnati Milling Machine Company, Cincinnati, Ohio, a corporation of Ohio Application May 25, 1931, Serial No. 539,686

14 Claims. (Cl. 90—11)

This invention relates to milling machines and more particularly to improvements in the construction and operation of the cutter spindles thereof.

One of the principal objects of this invention is to provide a centralized control station for a milling machine at which the operator may effect adjustment of the various work supports, the installation of cutters in the spindle, the determination of their rotative speed, and the actuation of the spindle starting clutch without changing his position at the machine.

Another object of this invention is to provide hydraulic means for clamping the cutter to the spindle of a milling machine and an interlock to prevent release of the hydraulic means during rotation of the spindle.

A further object of this invention is the provision of improved means for retaining an arbor or tool in the spindle of a milling machine.

A still further object of this invention is to so construct and organize the means for retaining an arbor or tool in a milling machine spindle that the tool may be both assembled and locked with the spindle from the operator's normal position at the machine.

An additional object of this invention is the provision of power operated means for clamping an arbor or tool into driving engagement with its spindle which is adaptable for remote control so that the clamping operations may all be effected from the station at which the installation of the cutter is performed.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 1 is an elevation of a milling machine embodying the principles of this invention.

Figure 2 is a section through the draw bolt actuating cylinder.

Figure 3 is an enlarged detail showing the means for connecting an arbor or tool to the draw bolt for locking the same to the spindle.

Figure 4 is a section on the line 4—4 of Figure 3.

Figure 5 is an expanded view of the variable speed transmission for the spindle.

Figure 6 is a detail view of a connecting bolt.

Figure 7 is a view similar to Figure 3 showing a modified form of connection between tool and draw bolt.

Figure 8 is a section on the line 8—8 of Figure 7.

Figure 9 is a detail view of the connecting bolt shown in Figure 7.

Figure 10 is a section on the line 10—10 of Figure 1.

Figure 11 is a detail section on the line 11—11 of Figure 10.

Figure 12 is a section on the line 12—12 of Figure 10.

Figure 13 is a section on the line 13—13 of Figure 10.

Figure 14 is a longitudinal section on the line 14—14 of Figure 11.

Figure 15 is a view of the spindle speed control mechanism as viewed generally on the line 15—15 of Figure 1.

Figure 16:
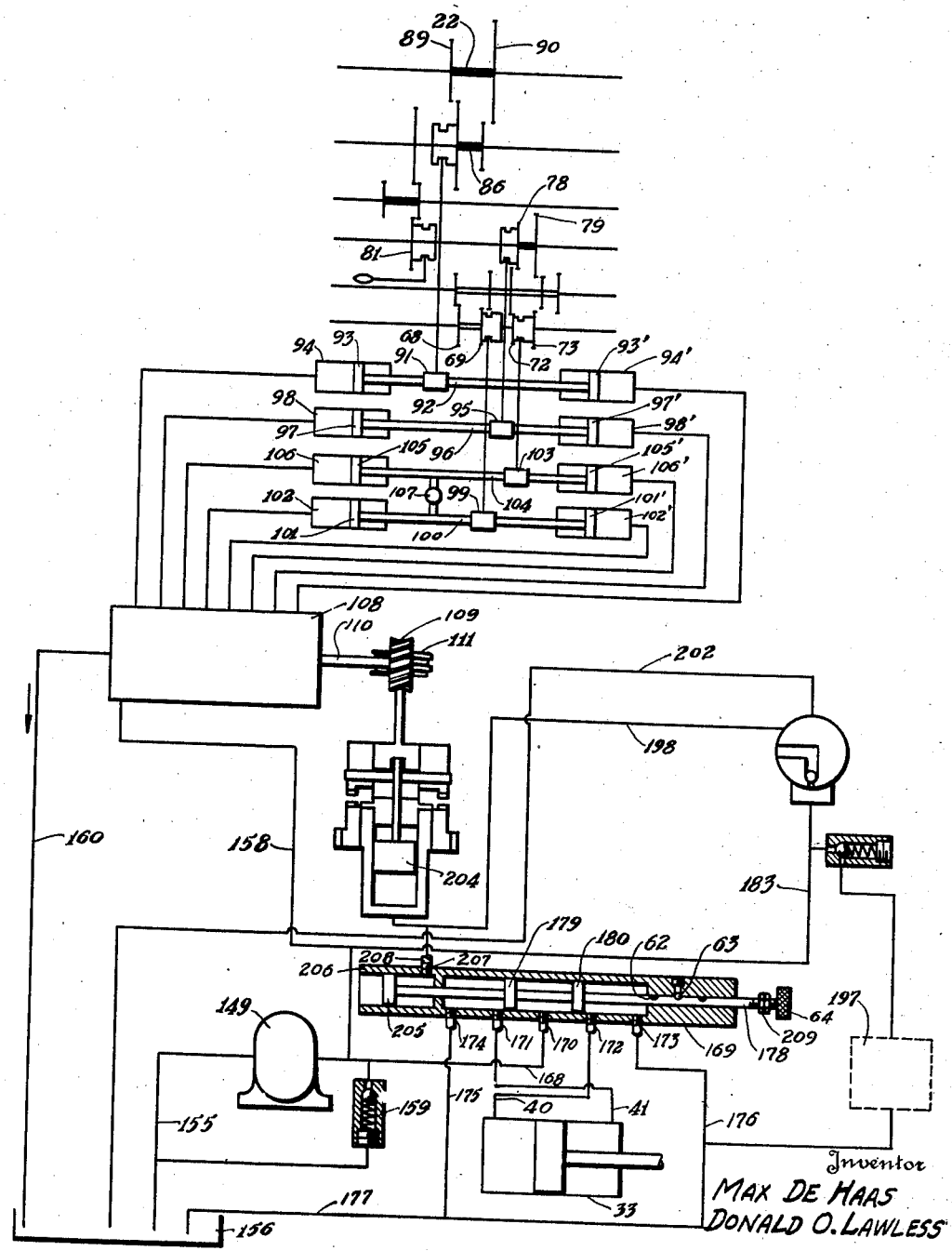
Figure 16 is a diagrammatic view of the hydraulic control system of the machine.

In Figure 1 of the drawings the reference numeral 10 indicates the column of a milling machine having a guideway 11 formed on one vertical face thereof for slidably receiving a work support organization comprising a knee 12, a saddle 13 and a table 14. The knee is slidably mounted upon the column guideway, and supports the saddle for transverse movement toward and from the column while the table is reciprocably mounted upon the saddle for movement at right angles to the saddle movement. The translatory movements of the knee, saddle and table may be controlled respectively, by suitable levers, such as 12', 13' and 14', which are grouped together at the front of the machine forming a general control station.

The particular form of mechanism for effecting translation of these supports, as well as the control connections to said levers, form no part of the present invention, as such means are known and, therefore, their description is not deemed necessary.

In addition to controlling the adjustment of the various work supports, as well as loading or unloading the work, it is also desirable and so contemplated by this invention that the installation of the cutter, its attachment to the spindle, the determination of its speed of rotation, and the starting and stopping be controlled from this station making it possible to set-up the machine from the same position at which it is operated.

A cutter spindle 15 is journaled in the upper part of the column for rotating a cutter in opposition to a work piece carried by the table to effect a processing operation. An overarm 16 is adjustably mounted in guideways formed on the top of the column and has adjustably mounted on the end thereof a pendant 17 which serves as an outboard support for a cutter arbor when such is utilized for supporting and driving a cutter.

The spindle is adapted to be driven by a prime mover 18 located in the base of the column which constantly rotates a main driving shaft 19 through a power transmitting band 20. A variable speed transmission, such as shown in expanded view in Figure 5, may be interposed between a main clutch 21 on the shaft 19 and the gear couplet 22 keyed to the spindle for imparting various rates of speed thereto.

The variable speed transmission comprises the horizontal spline shaft 67 journaled in the column of the machine and adapted to be coupled with the main driving shaft 19 by means of the starting clutch 21. Slidably mounted on the shaft 67 are a pair of gear couplets, one of which comprises the gears 68 and 69 shiftable into mesh with gears 70 and 71 respectively; and the other comprising gears 72 and 73 shiftable into mesh with gears 74 and 75 respectively. The gears 70, 71, 74 and 75 are fixed to a shaft 76 which is journaled in the column parallel to the shaft 67 and also parallel to a third shaft 77 which has slidably splined thereon a gear couplet comprising gears 78 and 79 which are shiftable into mesh with the gears 74 and 80 respectively, carried by the shaft 76. A reverser is interposed between a gear 81 slidably mounted on the shaft 77 and a gear 82 fixed for rotation with the shaft 83. It comprises a gear 84 in constant mesh with the gear 82 and an idler 85 fixed for rotation with the gear 84. The operation is such that movement of the gear 81 to the left will effect intermeshing with the gear 85 to cause rotation of the spindle in one direction and movement to the right will effect direct intermeshing with the gear 82 to effect rotation in the opposite direction. Splined on the shaft 83 is the shiftable gear couplet 86 comprising the large gear 87 and the pinion gear 88, the large gear meshing with the small gear 89 of the couplet 22 upon shifting of the couplet 86 to the left and the pinion 88 meshing with the face gear 90 of said couplet upon shifting of the couplet to the right. Since there are four shiftable gear couplets the transmission is capable of transmitting any one of sixteen speeds to the spindle.

In order to effect the various rates of speed in the spindle transmission, power means, such as a plurality of hydraulic motors, preferably in the form of a piston and cylinder, have been provided for shifting the various movable members of the transmission. In other words, each shiftable element is connected to an individual piston rod having pistons on each end mounted in separate cylinders and means are provided for controlling the admission of fluid pressure to a selected cylinder or cylinders and the discharge from other cylinders in predetermined sequence to determine the speed of the spindle. For the sake of convenience these cylinders have been diagrammatically illustrated in Figure 16 which also shows the connection between each pair of cylinders and its respective shiftable element. For instance, the couplet 86 is provided with a shifter fork 91 which is secured to a piston rod 92 having pistons 93 and 93' on opposite ends thereof slidably mounted in cylinders 94 and 94' respectively. The gear couplet 78—79 has a shifter fork 95 secured to a piston rod 96 having pistons 97 and 97' secured to opposite ends thereof and slidably mounted in cylinders 98 and 98' respectively. Similarly, the gear couplet 68—69 is provided with a shifter fork 99 secured to the piston rod 100 having pistons 101 and 101' slidably mounted in cylinders 102 and 102' and the couplet 72—73 has a shifter fork 103 secured to a piston rod 104 having pistons 105 and 105' secured to opposite ends thereof and slidably mounted in cylinders 106 and 106' respectively.

It will be noted that the gear couplets 68—69 and 72—73 are mounted on the same shaft and, therefore, both can not be engaged at the same time without causing breakage of the parts. Accordingly, an interlock 107 is interposed between the piston rods 104 and 100 to insure that only one will be moved to a power transmitting position at a time. This interlock may be of any suitable form, the one shown in copending application of Nenninger and Ernst, Serial Number 395,929, filed September 28, 1929, being found satisfactory for present purposes. This application may also be referred to for a more complete description of the construction and operation of the hydraulic shifting mechanism referred to herein.

In order to control the admission or discharge of pressure to each of these cylinders and thereby determine the position of the different couplets which, in turn, will determine the speed to be imparted to the spindle, a control or selector valve 108 has been provided having a rotor which may be of the same form as shown in the previously mentioned application. This rotor is adapted to be power rotated and to this end is provided with a spiral gear 109 secured to the end of a shaft 110 which is integral with the rotor. A spiral gear 111 is keyed to a shaft 112 journaled in the column of the machine at right angles to the valve and meshing with the gear 109 for imparting rotation thereto. A clutch member 113 is splined on the shaft 112 and slidable into engagement with the clutch member 114 mounted for free rotation but fixed against longitudinal movement on the shaft, having integral therewith a gear 115 meshing with a pinion 116. This pinion is secured to the end of a shaft 116' which is constantly driven by the shaft 117 through a pair of spiral gears 118—118'. It should now be apparent that movement of the clutch 113 into engagement with the clutch 114 will cause rotation of the spiral gears 111 and 109 and thereby rotation of the valve rotor. This valve has sixteen positions corresponding to the sixteen speeds of the transmission.

The clutch 113 is adapted to be remotely controlled from the operator's normal position at the front of the machine through the following mechanism. A horizontal shaft 119 is journaled in the knee and provided at one end with a crank 120 pivotally connected to the end of a crank 121 secured to a stub shaft 122 journaled in the forward wall of the knee and provided on the exterior end thereof with a manual control lever 123. A ball ended lever 124 is secured to the other end of the shaft 119 in engagement with a radial socket formed in a collar 125 secured to the end of a vertical shaft 126, telescopingly mounted in a hollow shaft 127 which is journaled in a fixed part of the machine against vertical movement. A shaft 128 is journaled in the base of the machine and provided upon opposite ends with eccentrically located pins 129 and 129', the pin 129 engaging a cam groove 130 formed in the periphery of a cam 131 pinned to the shaft 127 and the pin 129' engaging a socket formed in the end of a vertically reciprocable connecting rod 132. The effect of this mechanism is to cause vertical reciprocation of the rod 132 upon oscillation of the handle 123.

The operation is as follows: The lever arm 121 integral with the lever rotates shaft 119 by means of the crank arm 120 which, in turn, causes joint rotation of the shaft 126, through engagement of the ball ended lever 124, integral with the shaft 119, with the radial slot formed in the collar 125 integrally with shaft 126. This shaft, by means of the splined telescoping connection with the shaft 127, will cause rotation of the latter and its attached cam 131. The shape of the cam groove formed therein will cause rotation of the stub shaft 128 by means of the eccentric pin 129 and thereby upward or downward movement of the eccentric pin 129' and thus reciprocation of the connecting rod 132.

The connecting rod 132 has circular rack teeth 133 formed in the upper end thereof meshing with elongated gear teeth 134 formed in the end of a rock shaft 135 journaled in the wall of the column. A crank 136, keyed to the other end of shaft 135, is pivotally connected at 137, as shown in Figure 15, to a connecting link 138. The lower end of this link abuts a pin 139 secured in one end of a pivoted bell crank 140 which has one arm in the form of a shifter fork 141 engaging the annular groove 142 formed in the clutch member 113. A spring 143 serves to hold the end of the bell crank into engagement with the end of the link 138 and thereby normally maintain the clutch in a disengaged position.

From the foregoing it should now be apparent that engagement of the clutch 113 may be remotely controlled by the lever 123, which is located at the general operating position, in this instance at the front of the machine, and thus the determination of the speed of the spindle is determined from the same station as the adjustment of the work supports.

In order that the operator may know the position of the selector valve and thereby the speed at which the spindle will be rotated, the shaft 112 is provided with a gear 144 meshing with a gear 145 secured to the end of a stub shaft 146 journaled in the wall of the column, having secured to the exterior end thereof a speed dial 147. This speed dial is adapted to cooperate with a fixed pointer 148 from which the operator may visibly and directly determine the speed at which the transmission is set.

Hydraulic pressure for the operation of the gear shifting mechanism is provided by means of a pump 149 which is constantly driven from the prime mover through a gear train comprising the gear 150 secured to the shaft 119 meshing with a gear 151 mounted on a stub shaft 152 and having integral therewith a pinion 153 in mesh with a gear 154 keyed to the end of the pump driving shaft 117. It will be noted that the shaft 117 serves as a constant driver for the clutch 114, as well as the pump 149. This pump is provided with an inlet 155 through which fluid is drawn from a reservoir 156 formed by a horizontal wall 157 in the column above the motor chamber and forced, by means of channel 158, to the selector valve 108. An overflow or relief valve 159 may be provided to prevent excessive pressures in the various lines and thereby limit the amount of leakage. A return channel 160 is coupled to the selector valve for returning the fluid to the reservoir.

The main starting clutch 21 is provided with a clutch spool 161 engaged by a pivoted shifter fork 162 which is connected to a crank 163 by means of the connecting link 164. The crank 163 is fixed to one end of a shaft 165, Figure 10, which is horizontally journaled in the upper part of the column with one end projecting beyond the exterior face thereof and provided with an operating lever 166. Upward movement of this lever will cause clockwise rotation of the shifter fork 162 about its pivot 167 to effect engagement of the clutch 21 and thereby rotation of the cutter spindle. It will be noted from Figure 1 that the lever 166 extends to the forward part of the machine where it may be grasped by the operator from his normal position at the machine. Thus the starting and stopping of the spindle is controllable from the general control station at the front of the machine.

The spindle of a milling machine is utilized for driving a cutter or tool and since these tools may be of different types and sizes, different means are utilized for retaining them in the spindle. For the ordinary circular type of milling cutter, an arbor is utilized, to which the cutter, in turn, is keyed for rotation. The arbor is usually provided with a tapered shank for engaging the chuck socket of the spindle, while so called end mills are in many cases provided with an integral shank for direct mounting in the cutter spindle. Other types of cutters are provided with adapters by which they are operatively connected to the cutter spindle. All of these driven members will be included hereafter under the term of tools for the sake of convenience and this term is, therefore, not to be considered as a word of limitation. All of the tools, therefore, will be found to have a tapered shank which is adapted to be inserted in the tapered socket formed in the end of the spindle.

In milling machines, contrary to the practice in some machine tools, means are usually provided for positively securing or retaining the driven tool member in the spindle socket and this has universally taken the form of a draw-in bolt, more commonly termed a draw bolt. This draw bolt is usually threaded on one end for engaging a threaded bore in the end of a tool and it extends through an axial bore of the spindle to the rear of the machine where it is provided with a flanged operating nut. This construction has many disadvantages in that it necessitates traveling to the rear of the machine every time a cutter is changed and, on account of the width of the column, it is practically impossible for one man to hold the tool in the spindle while attempting to thread the draw bolt into it from the other end of the spindle. Also, upon releasing the draw bolt, there is the possibility that the tool will loosen in its bore and be accidentally knocked out before the operator can get around to the front of the machine which might cause irreparable injury to the cutter.

These disadvantages have been obviated in the present structure by providing the spindle with a draw bolt which may be power operated and remotely controlled from a position adjacent the nose of the cutter spindle, thereby making it possible for the operator to hold the tool in position while clamping it to or unclamping it from the spindle. In addition, novel means have been provided for connecting the tool with the draw bolt. As shown in Figure 3, the draw bolt 23, which is slidably mounted in an axial bore 24 formed in the spindle, is provided with an enlarged tapered head 25 in the form of a collet. The collet is provided with a tapered socket 26 for receiving the double tapered end 27 of a connecting bolt 28. This bolt, as shown in Figure 6, is provided with a threaded end portion 29 which is adapted to be threaded into the standard threaded bore 30 formed in the end of all standard tools used in milling machines. The connecting bolt may be screwed into the end of the tool by means of a suitable wrench engaging a hexagonal socket 31 formed in the end thereof.

The collet is split into three portions, as shown in Figure 4, by means of a plurality of kerfs 32 thereby making the intervening portions flexible to permit insertion of the head of the connecting bolt. Assembly is effected by threading the connecting bolt in the end of the tool and moving the draw bolt sufficiently toward the front of the machine to permit flexing of the divided portions of the collet head and thereby insertion of the connecting bolt head. The draw bolt is then retracted which causes the flexible portions to tightly grip the head of the connecting bolt and thereby positively draw the tapered shank of the tool into frictional driving engagement with the tapered bore of the spindle. It will, therefore, be seen that longitudinal movement of the draw bolt effects a positive lateral movement of the flexible portions of the collet head into engagement with the head of the connecting bolt thereby insuring a positive grip thereon while also effecting a positive longitudinal movement of the tool into its socket.

Means have been provided for reciprocating the draw bolt by power and this is preferably accomplished by the use of hydraulic actuated means comprising a cylinder 33 and a piston 34, the piston being directly connected to the rear end of the draw bolt. The cylinder is provided with a threaded bore for direct attachment to the end of the cutter spindle 15, as shown in Figure 2. From this it will be seen that the cylinder will rotate with the spindle and also, due to friction between the bolt and spindle, the draw bolt will rotate with the cylinder thereby preventing relative rotation between the piston and cylinder which might cause undue wear and leakage past the piston. After assembly of the cylinder 33 with the spindle and the piston 34 with the draw bolt, a cylinder head 36 is threaded or otherwise secured, in the opposite end of the cylinder. A sleeve 37 is fixed to the rear of the column against rotation by set screws 38. This sleeve has a bore 39 in which the cylinder 33 rotates and the parts fit together like a bearing although the sleeve does not serve to support any weight.

A pair of fluid pressure pipes 40 and 41 are threaded in the top portion of the sleeve in spaced relation to one another and in the plane of a pair of spaced annular grooves 42 and 43 formed in the periphery of the cylinder. Radial bores or ports 44 and 45 serve to conduct the fluid from these grooves into opposite ends of the cylinder. It should now be apparent that even although the cylinder rotates with the spindle, constant communication is maintained between each end of the cylinder and the stationary pressure channels. Admission of pressure to one end of the cylinder through the channel 40 will effect release of the tool while the admittance of pressure through the channel 41 will effect clamping of the tool.

The fluid in the grooves 42 and 43 is under considerable pressure and, therefore, some leakage will take place laterally of the grooves. To prevent this leakage of oil escaping at the end of the sleeve and cascading over the machine, the sleeve is provided with a plurality of internal annular grooves 46. These grooves are connected to a longitudinal channel 47 formed in the bottom of the sleeve closed at one end and registering with a port 48 formed in the column whereby the fluid, collected in the various grooves, will drain to the channel 47 and thereby, through the port 48, return to the reservoir within the column.

The pump 149 is also utilized for supplying fluid pressure to the draw bolt actuating cylinder. As shown in Figure 16, a channel 168 connects the pressure side of the pump with a control valve 169 which, as shown in Figure 5, is mounted in the forward wall of the column. This valve is provided with a pressure port 170 and a pair of outlet ports 171 and 172. To these outlet ports are connected the pipes 40 and 41 which extend to the sleeve 37. The valve is provided with a pair of exhaust ports 173 and 174 which are connected by means of channels 175 and 176 to the return line 177.

The valve plunger 178 is slidably mounted in the valve body 169 and is provided with a pair of spools 179 and 180 whereby in the neutral position of the valve, as shown in Figure 16, port 172 is connected with the exhaust port 173 and the port 171 is connected with the exhaust port 174 thereby permitting the draw bolt 23 to be freely moved back and forth as the pressure will be cut off from each end of the cylinder. This permits the parts to be disassembled for inspection, as well as providing means for immediately cutting off the pressure in case of accident.

Upon movement of the valve plunger to the right the pressure port 170 will be connected to the port 172 causing pressure to flow to the right hand end of the cylinder 33 through the channel 41 while still maintaining the channel 40 connected to the reservoir. Upon movement of the valve plunger to its extreme left position the pressure port 170 will be connected with the port 171 permitting pressure to flow through the channel 40 to the left end of the cylinder 33 causing movement of the draw bolt to the right and unclamping of the tool. The valve plunger is provided with a plurality of indents 62 and a spring pressed detent 63 is mounted in the valve body for cooperation therewith to maintain the valve plunger in any one of its three positions. It should now be apparent that the tool may be assembled with the draw bolt and, by means of the handle 64 in the valve plunger, the draw bolt may be reciprocated in either direction by power and maintained in such position even during rotation of the cutter spindle.

It is highly desirable during the rotation of the cutter spindle that the tool should not become unlocked with respect to the spindle, such as by accidental withdrawal of the valve plunger 178. It is also necessary to the proper operation of a milling machine that the speed of the spindle should not be changed while the transmission is in operation as, due to the high speed of some of the parts, undue wear and possible destruction might follow in attempting to cause intermeshing of some of the gears. Accordingly, there has been provided an hydraulic interlock which is adapted to function with the starting clutch control lever to prevent engagement of the selector valve driving clutch 113 and a second hydraulic interlock to prevent outward movement or withdrawal of the valve plunger 178 which determines the actuation of the draw bolt. This is accomplished through the following means, reference being had more particularly to Figures 10 to 14 inclusive.

The shaft 165, which supports the control lever 166, is in the form of a rotatable valve and is surrounded by a valve sleeve 181 which is fixed to the column by means of bolts 182 passing through a flange formed in one end of the sleeve and threaded in the column. A channel 183 connects the pump with a port 184 formed in the sleeve surrounding the valve. The port registers with a peripheral annular groove 185 formed in the valve which communicates with a longitudinal passage 186 leading to the radial passage 187 formed in the shaft 165. This passage has a non-return valve therein in the form of a spring pressed ball 188. Another radial passage 189 at right angles to the passage 187 is formed in the valve member to establish pressure communication with a port 190 upon rotation of the shaft 165.

Since the radial channel 187 is in constant communication with the pump it is always under pressure and to prevent excessive pressures building up when the channel is closed, a blow off or safety valve is provided in the form of a spring closed valve plunger 191 which permits fluid to escape to a lubricating system when the pressure exceeds a predetermined limit. In other words, the valve acts as a safety valve in the sense that it limits the pressure in the channel 186 to a predetermined amount and as the pressure intermittently exceeds that amount, oil escapes by the way of port 192 to the lubricating system of the machine. A segmental groove 193 is formed on the valve member 165 to connect the port 190 with a port 194 which intersects a longitudinal bore 195 formed in the housing. A pipe 196 is threaded in the end of the bore for connecting the oil to a lubricating system indicated generally by the reference numeral 197, as shown in Figure 16, from which the oil will eventually drain back to the reservoir. A channel 198 serves to conduct the fluid from the port 199 to the cylinder 200. Another port 201 is formed in the valve housing which is connected to the return line 202 leading to the reservoir located in the base of the machine. The shaft 165 has a chordal groove 203 formed therein for establishing communication between the port 199 and the port 201 when the shaft is rotated to disconnect the main clutch 21. Upon rotation of the shaft 165 by the handle 166 in a counter clockwise direction to the position shown in Figure 1, the valve will be rotated in a clockwise direction from the position in Figure 12 establishing communication between the channel 189 and the port 199 to admit pressure to the clutch knock out cylinder. In this position of the parts the main clutch 21 will be engaged causing actuation of the variable speed transmission and the cylinder 200 will be under pressure thus insuring that the clutch teeth 114 and 113 will be maintained in a disengaged position. Upon rotation of the handle the cylinder 200 will be connected with the return line 202 upon communication being established between the ports 199 and 201. This will permit the fluid in cylinder 200 to be freely forced back to the reservoir upon reciprocation of the clutch 113 and its connected piston 204. From this it will be seen that when the main clutch is engaged and the spindle is rotating that it will be impossible for the operator to engage the speed change mechanism to effect a rate change in the variable speed transmission.

The valve plunger 178 is provided with another spool 205 secured to the end thereof and slidably mounted in a separate cylinder 206. One end of this cylinder has a port 207 formed therein which is connected to the channel 198 by a branch channel 208. Accordingly, when fluid pressure flows in the line 198 to insure disengagement of the selector valve clutch, fluid pressure will also flow to the cylinder 206 to insure that the valve plunger 178 and thereby that the draw bolt will be moved to a clamping and locking position. To insure proper positioning of the valve plunger 178 a pair of adjustable lock nuts 209 are threaded on the end of the plunger whereby they may be adjusted to prevent any overthrow in the movement of the valve upon admission of pressure to the cylinder 206.

From the preceding description, it should now be apparent that a milling machine has been provided in which the setting-up operations including both cutter installation and work support adjustment, as well as general operation of the machine including work support movement and the speed and rotation of the spindle may all be effected from a central control station. Interlocking means have also been provided to insure that no change of spindle speed is effected, or that the tool will be unclamped, while the cutter is rotating under power. In addition, improved means have been provided for securing the tool or cutter to the spindle which simplifies the setting-up operation and eliminates the possibility of accidental damage to the tool and which makes it possible to change very quickly from one set-up to another. These elements all contribute toward reducing the amount of set-up time over prior structures, simplifying the control and operation of the machine thereby conserving the energy and patience of the operator, and, in general, producing a machine that is economical from both a setting-up and an operating standpoint.

That which is claimed is:

1. A milling machine having a column including front and rear walls, a cutter spindle journaled at opposite ends in said walls and having an axial bore terminating in a tool receiving socket, a draw bolt extending longitudinally of the bore for securing a tool in said socket, an hydraulic motor mounted on the end of the spindle and operatively connected to the draw bolt, a pump mounted in the column, a common prime mover for actuating said pump and spindle, means connecting the pump with the motor during rotation of the spindle, and control means mounted on the column wall adjacent the tool receiving end of the spindle for determining the admission of pressure to said motor.

2. A milling machine having a column, a cutter spindle journaled therein having a tapered tool receiving recess in the end thereof, a bolt longitudinally slidable in said spindle and having a tapered split collet formed in one end, means for coupling a tool to said collet, and power operated means effective on said bolt for drawing the tool into said recess, the peripheral surface of the collet engaging the tapered recess to positively lock the parts together for longitudinal movement.

3. A milling machine having a column, a spindle journaled in the column, a tool receiving recess formed in one end of the spindle, means to secure a tool in said recess comprising a draw bolt extending axially of said spindle, a piston on the end of said draw bolt, a cylinder secured to the end of the spindle for rotation therewith and slidably receiving said piston, a sleeve fixed to the column and surrounding said cylinder, a source of pressure, and means coupling the pressure with the sleeve for admission to the cylinder.

4. A milling machine having a column, a spindle journaled in the column, means in one end of the spindle for receiving a tool, means for holding a tool therein comprising a draw bolt, an hydraulic motor on the other end of the spindle for operating the draw bolt including a cylinder, a sleeve surrounding said cylinder and secured to the column, ports in said sleeve, inlet and outlet ports in opposite ends of the cylinder, annular grooves formed in the periphery of the cylinder for maintaining communication between the respective groups of ports during relative rotation of the cylinder, and channel means in the sleeve on opposite sides of said ports for conducting leakage back to the reservoir.

5. In a milling machine having a rotatable spindle, the combination of a variable speed transmission therefor, a speed change mechanism, a branch transmission for power actuating said mechanism, a prime mover, individual means for coupling each of said transmissions with the prime mover for actuation thereby, power actuated mechanism for locking a tool to said spindle for rotation thereby, and hydraulic interlock devices jointly operable by one of said means to prevent coupling of the branch transmission with the prime mover and unlocking of the tool from the spindle when the variable speed transmission is coupled with the prime mover.

6. A milling machine having a rotatable spindle, power operated means for securing a tool to said spindle, a variable speed transmission therefor, a speed change mechanism coupled with the transmission for effecting speed changes therein, a prime mover, clutch means for connecting the transmission with the prime mover, means to selectively couple the mechanism with the prime mover for actuation thereby, manual control means for determining the effective coupling of said mechanism and the actuation of said power operated securing means, and means to prevent operation of said manual means when the transmission clutch is engaged including hydraulically actuated lock outs, and a pressure control valve therefor jointly operable with the transmission clutch means.

7. A milling machine having a rotatable cutter spindle, power actuable means for locking a cutter to said spindle for rotation thereby, a variable speed transmission for the spindle, an hydraulically actuated speed change mechanism associated with said transmission for effecting speed changes therein, a prime mover couplable with the transmission for actuation thereof, a source of fluid pressure, a rotatable valve for controlling the application of fluid pressure to said speed change mechanism, clutch means to connect said valve with the prime mover for power actuation thereby, a starting clutch for coupling the speed transmission with the prime mover, a starting clutch control lever, and pressure means released by said lever upon movement to engage said starting clutch to lock said power actuable means and the valve clutch means against movement during rotation of the spindle.

8. A milling machine having a cutter spindle, hydraulically actuated means for securing a cutter in said spindle, a prime mover, a variable speed transmission actuated by the prime mover for imparting rotation to the spindle, a rate change mechanism associated with the transmission, individual clutch means for connecting the prime mover with the transmission and the mechanism, operating means for each clutch, a control valve coupled with the operating means for one clutch, a piston and cylinder coupled with the operating means for the second clutch, a source of hydraulic pressure connected to the control valve, an hydraulic interlock for said hydraulically actuated means, and channel means for conducting pressure to said cylinder and said interlock to prevent actuation of the connected parts during rotation of the spindle.

9. A milling machine having a rotatable spindle, a draw bolt reciprocably mounted therein for securing a tool to said spindle for rotation thereby, a piston and cylinder for actuating said draw bolt, a control valve therefor, a prime mover, a variable speed transmission in the column interposed between the prime mover and the spindle, a first clutch for coupling the transmission with the prime mover, a branch transmission, a rate change mechanism actuated thereby, a second clutch for coupling the branch transmission with the prime mover, a clutch control shaft, means for connecting the first named clutch with the shaft for operation thereby, hydraulic means controlled by said shaft for permitting or preventing engagement of the second clutch, an hydraulic interlock coupled with the control valve, said hydraulic means also acting on the interlock to prevent movement of the draw bolt when said first named clutch is engaged.

10. A milling machine having a spindle, a prime mover, a variable speed transmission coupling the prime mover to the spindle, speed change mechanism associated with the transmission, power operated means for actuating said mechanism including a clutch, a draw bolt reciprocably mounted in the spindle for securing a tool therein, hydraulically actuated means for reciprocating the draw bolt including a piston and cylinder, a source of pressure, a control valve for determining the coupling of pressure to the draw bolt cylinder, an interlock cylinder coupled to the speed change clutch, a second interlock cylinder connected to the draw bolt control valve plunger, an auxiliary pressure channel extending from the pump to said interlock cylinders, and a control valve in the channel for determining the admittance of pressure to said interlock cylinders.

11. A milling machine having a cutter spindle, a tool receiving socket formed in one end of the spindle, a draw bolt extending axially of the spindle having one end projecting into said socket, means on the end of the draw bolt for detachable connection to the end of a tool, a piston and cylinder carried at the opposite end of the spindle, said piston being operatively connected to the end of the draw bolt, a control valve, channels extending from opposite ends of the cylinder to the control valve, a source of pressure, and a valve plunger reciprocably mounted in the control valve, said plunger having a neutral position and a fluid transmitting position on either side thereof whereby either end of the cylinder may be connected to pressure for determining the direction of movement of the draw bolt, or both ends of the cylinder disconnected from pressure to permit the free movement of the draw bolt.

12. A milling machine having a cutter spindle, a tool receiving socket formed in one end of the spindle, a draw bolt extending axially of the spindle having one end projecting into said socket, means on the end of the draw bolt for detachable connection to the end of a tool, a piston and cylinder carried at the opposite end of the spindle, said piston being operatively connected to the end of the draw bolt, a control valve, channels extending from opposite ends of the cylinder to the control valve, a source of pressure, and a valve plunger reciprocably mounted in the control valve, said plunger having a neutral position and a fluid transmitting position on either side thereof whereby either end of the cylinder may be connected to pressure for determining the direction of movement of the draw bolt, or both ends of the cylinder disconnected from pressure to permit the free movement of the draw bolt, and detent mechanism for maintaining the valve in any one of its three positions.

13. A milling machine having a cutter spindle, a tool receiving socket formed in one end of the spindle, a draw bolt extending axially of the spindle having one end projecting into said socket, means on the end of the draw bolt for detachable connection to the end of a tool, a piston and cylinder carried at the opposite end of the spindle, said piston being operatively connected to the end of the draw bolt, a control valve, channels extending from opposite ends of the cylinder to the control valve, a source of pressure, and a valve plunger reciprocably mounted in the control valve, said plunger having a neutral position and a fluid transmitting position on either side thereof whereby either end of the cylinder may be connected to pressure for determining the direction of movement of the draw bolt, or both ends of the cylinder disconnected from pressure to permit the free movement of the draw bolt, detent mechanism for maintaining the valve in any one of its three positions, an interlock cylinder formed on the end of said control valve, a piston mounted in said cylinder and operatively connected with the valve plunger, and means to admit pressure to said cylinder when the valve plunger is in a tool locking position to prevent operation of the valve during rotation of the spindle.

14. In a milling machine having a column including front and rear walls, a tool spindle having its opposite ends journaled in the respective walls, a tool receiving socket formed in one end of the spindle, a draw bolt extending axially of the spindle and having one end projecting into said socket for clamping a tool therein, a piston secured to the opposite end of the draw bolt, a cylinder secured to the opposite end of the spindle and surrounding said piston, said cylinder having a pair of spaced peripheral grooves formed on the exterior thereof, radial ports formed in the grooves communicating with the interior of the cylinder, a sleeve surrounding the cylinder and fixed to the wall of the column, pressure ports formed in the sleeve and spaced in accordance with the spacing of said peripheral grooves for maintaining communication with the cylinder during rotation thereof, a reservoir formed in the column, a pressure pump and control valve for controlling the delivery of fluid from the reservoir under pressure to said ports for determining operation of the draw bolt, a longitudinally extending channel formed in the sleeve, radial ports extending from the channel to the interior of the sleeve, said ports being spaced on the outside of the peripheral grooves in the cylinder and a port connecting said longitudinal groove with the interior of the column whereby leakage from the peripheral grooves will be returned to the reservoir in the column.

MAX DE HAAS.
DONALD O. LAWLESS.